US005891280A

United States Patent [19]

Gillner et al.

[11] Patent Number: 5,891,280

[45] Date of Patent: Apr. 6, 1999

[54] METHOD AND APPARATUS FOR THE DEPOSITION AND FIXING OF A THIN METAL WIRE ON A THERMOPLASTIC FILM OF A GLAZING OF LAMINATED GLASS

[75] Inventors: Manfred Gillner, Aachen; Siegfried Pikhard, Roetgen, both of Germany; Luc Vanaschen, Eupen, Belgium; Hans-Jurgen Eckstein, Grevenbroich, Germany

[73] Assignee: Saint-Gobain Vitrage, Courbevoie, France

[21] Appl. No.: 744,326

[22] Filed: Nov. 7, 1996

[30] Foreign Application Priority Data

Nov. 7, 1995 [DE] Germany ........................ 195 41 427.6

[51] Int. Cl.[6] ............................ B32B 31/00; B29C 65/00

[52] U.S. Cl. ............................ 156/64; 156/250; 156/285; 156/538

[58] Field of Search ................................ 427/58; 118/50; 428/209; 156/64, 250, 285

[56] References Cited

U.S. PATENT DOCUMENTS

| | | | |
|---|---|---|---|
| 3,720,808 | 3/1973 | Morrissey | 219/469 |
| 5,164,254 | 11/1992 | Todd et al. | 428/290 |
| 5,282,301 | 2/1994 | Roentgen et al. | 29/33 F |

*Primary Examiner*—S. Mark Claroy
*Assistant Examiner*—Alton Pryor
*Attorney, Agent, or Firm*—Oblon, Spivak, McClelland, Maier & Neustadt, P.C.

[57] ABSTRACT

Thin resistance wires are deposited in curved form on a thermoplastic film for the manufacture of a car glazing which can be electrically heated. The thermoplastic film is kept by vacuum on the surface of a cylindrical drum having a perforated cylindrical wall. The drum is rotated and the wire deposited and fixed on the film with the aid of a wire deposition apparatus. The wire deposition apparatus is mounted on a carriage able to move parallel to the longitudinal axis of the drum. The carriage is driven by means of a moving screw rotated by a drive motor. The drive motor is controlled by a processor via a regulating amplifier controlled by the processor in accordance with a time-travel program established in accordance with the desired curved shape of the wires.

10 Claims, 1 Drawing Sheet

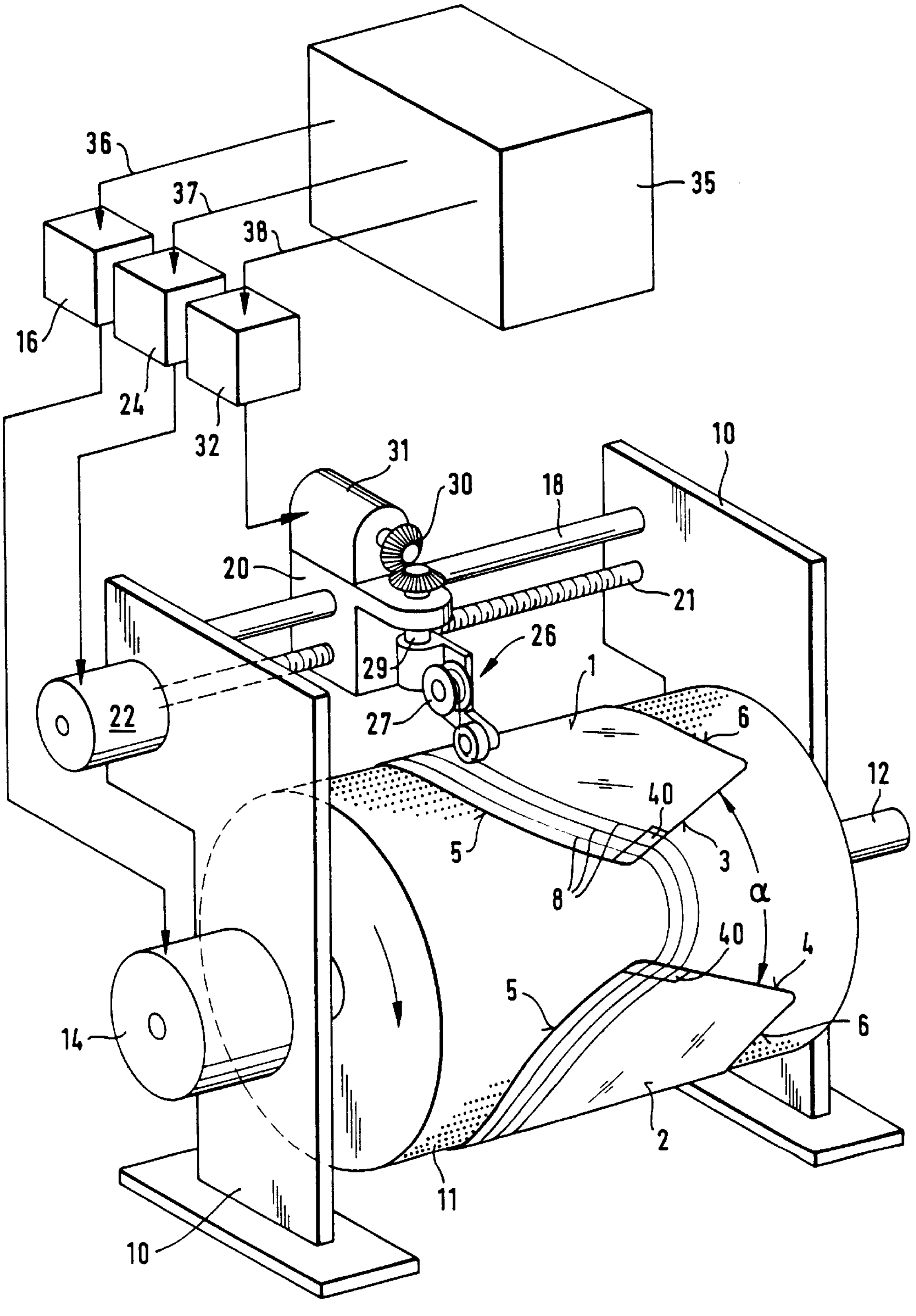
36
37
38
35
16
24
32
31
30
18
10
20
21
26
29
22
27
1
6
12
40
5
3
8
α
40
5
4
6
14
2
11
10

METHOD AND APPARATUS FOR THE DEPOSITION AND FIXING OF A THIN METAL WIRE ON A THERMOPLASTIC FILM OF A GLAZING OF LAMINATED GLASS

BACKGROUND OF THE INVENTION

1. Field of the Invention

The present invention relates to a method for the deposition and fixing of a thin metal wire on the surface of a thermoplastic film of a laminated glazing, in which the thermoplastic film is kept by vacuum on the surface of a cylindrical drum which is rotated, and the metal wire is deposited in continuous manner on the film, as a result of the application of a linear advance movement to the wire deposition apparatus on a guide positioned parallel to the drum axis and with the aid of a wire deposition apparatus having a heated crimping tool, a wire supply reel and means for moving the wire from the wire supply reel below the heated crimping tool. It also relates to an apparatus for performing the method and to a thermoplastic film obtained from said method.

2. Discussion of the Background

A method of the aforementioned type is known from DE 4 201 620 A1. In this known method, the wire deposition apparatus is moved parallel to the drum axis by means of a screw drive while the drum rotates. As a result of a regular advance of the wire deposition apparatus along the axis, the wire is helically deposited on the surface of the drum and forms wire segments extending rectilinearly in a parallel arrangement on the film. The crimping tool is in this case constituted by a heated pressure roller. An electromagnetic brake is coupled to the supply reel to keep the wire under a predetermined tension.

Another known method is disclosed in EP 443 691 A1. In this case, prior to helical deposition, the wire is deformed by two meshing toothed wheels, so that it is deposited on the thermoplastic film in an undulating manner.

The known methods are used on a large scale for the production of electrically heatable, laminated safety glazings. In this case, collector conductors in the form of tinned copper foil strips are fixed to the thermoplastic film along two opposite edges of said film. Following the helical deposition of the metal wire, the latter is connected to the collector conductors by another tinned copper foil strip deposited on the lower copper foil strip, and the two copper foil strips are brazed to one another with inclusion of the wires. The wires are then cut into sections outside the collector conductors. The film provided with the wire segments is then removed from the drum for incorporation in the laminated glazing.

The heated laminated safety glazings are used both in buildings and in vehicles. In most cases, particularly in the case of rectangular glazings, the arrangement of the heating wires in rectilinear manner, such as is obtained with the aid of the aforementioned methods, is desired. But it has also been applied to non-rectangular glazing shapes, especially in the case of the heatable car rear windows.

SUMMARY OF THE INVENTION

An object of the invention is to provide a method that permits the deposition of a metal wire on the thermoplastic film in a random curved configuration.

The method according to the invention is based on the control of the drive for the linear advance of the wire deposition apparatus in accordance with a time-travel program established as a function of the desired curved shape of the wires. Thus, in place of a regular advance of the wire deposition in a single direction, the invention provides for the control of the displacement of the wire deposition apparatus in such a way that its advance takes place in two directions according to a given time-travel program established on the basis of geometrical data for the desired curved configuration of the wires. Thus, the speed of advance of the wire deposition apparatus is dependent on the drum rotation speed. In the case of limited curvatures of the wire runs, the drum rotation speed can remain constant if the direction of the wires is substantially transverse with respect to the longitudinal axis of the drum.

With this method, it is, e.g., possible in the case of car windscreens, whose lower edge extends in accordance with a more or less pronounced curve, to deposit heating wires on the film in a direction parallel to said curved edge, no matter what the shape of said curved edge.

In an advantageous development of the invention, the method can be performed in such a way that the drive for the rotary movement of the drum is also controlled in accordance with the time-travel program established in accordance with the desired curved shape of the wires. Whereas in the case of an identical rotation direction of the drum, it is possible to produce heating wires connected in parallel via collector conductors, it is possible to produce on the film sinuous runs of wire by a stepwise rotation of the drum and a linear, reciprocating movement of the wire deposition apparatus, and concentric, circular runs or other parallel runs of the wire by a repetitive drum rotation direction reversal and, if appropriate, a simultaneous, linear reciprocating movement of the wire deposition apparatus. In this way, the wire can be placed within the laminated safety glazing in virtually any desired configuration.

Accordingly to a supplementary advantageous aspect of the method according to the invention, it is also possible to control the angular position of the wire deposition apparatus about a rotation axis perpendicular or approximately perpendicular to the axis of the drum in accordance with the previously defined time-travel program. Thus, no force directed transversely to the direction of the respective wire is exerted on the latter at the deposition point, which could otherwise cause difficulties during wire deposition.

According to a particularly advantageous aspect, the method according to the invention is performed with the aid of a wire deposition apparatus for which the crimping tool is constituted by a pressure roller rolling on the film. Thus, in principle, it is possible to use both wire deposition heads, by means of which a straight wire is deposited in curved form, as described in EP 553 025 AL, and wire deposition heads as described in EP 496 669 B1 and which are suitable for deposition of an undulating wire.

The invention also proposes a plastic film, particularly intended to be associated with at least one rigid plate, e.g., of glass and which is in particular bent, so as to form a glazing and having metal wires deposited on its surface, the metal wires having non-rectilinear paths.

According to a variant of the invention, the plastic film is incorporated into a glazing.

According to an advantageous variant of the invention, the glazing has at least one curved edge and the metal wires are deposited in accordance with a curved path, particularly parallel to the curved edge of the glazing. Preferably, the wires are located in a bottom area of the glazing.

According to a variant of the invention, the glazing has an opaque layer deposited on the glass facing at least one portion of the metal wires.

The glazings according to the invention can in particular be used for heating glazings by supplying electric power to the wires.

Preferably, the glazing serves as a heating glazing in the bottom area, as well as preventing a sticking of the wiper blades in cold weather.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing, wherein the sole figure is an overall view of an apparatus for carrying out the invention.

DETAILED DESCRIPTION OF THE PREFERRED EMBODIMENT

With the aid of the apparatus in the non-limiting example shown in the figure, thermoplastic films, 1, 2, e.g., of polyvinyl butyral, can be provided in a chosen area with thin heating wires arranged in a curved configuration.

Films 1 and 2 are intended for inclusion in windscreens having a more or less trapezoidal shape with lateral edges 3 and 4, a lower, circular arc edge 5 and an upper, circular arc edge 6. The film can be slightly larger than that corresponding to the final shape of the windscreen. The projecting edge of the glass sheets, following the assembly of the film with said sheets, can be cut after assembly. The lower edge 5 has a convex, circular arc curvature. The lower portion of the windscreen, when fitted to a vehicle, extends beneath the engine hood or bonnet. This lower portion is to be electrically heatable, so that the heating wires 8 must extend parallel to the lower, curved edge 5.

The apparatus comprises a support 10, which supports a cylindrical drum 11 having a relatively large diameter. The drum is mounted to the support in rotary manner via a horizontal spindle. The drum 11 is hollow and the cylindrical drum wall is perforated. A vacuum pump (not shown) is connected to the interior of the drum 11 via a pipe 12. The films 1 and 2 are thus kept on the cylindrical surface of the drum by the resulting suction applied through the perforations in the drum wall.

The diameter of the drum 11 can, e.g., be chosen such that two films 1, 2 can simultaneously be deposited on the drum circumference. The two films 1, 2 then more or less occupy the positions shown in the drawing, in which the lateral adjacent edges 3, 4 do not extend parallel to one another, but together form a relatively large angle $\alpha$. While the heating wires 8 on each of the films 1, 2 describe a circular arc corresponding to the configuration of the lower edge 5 of the respective films, the circular arc described by the heating wires in the vicinity of the angle $\alpha$ between the lateral edges 3, 4, i.e., in the region of the drum surface between the edges 3, 4, has a curvature opposed to the curvature of the wires on the films 1, 2, so that the heating wires have an undulating configuration on the overall drum surface.

The constant torque motor 14, which is controlled by a regulating amplifier 16, is used for rotating the drum 11. On the support 10 above the drum 11 is provided a guide 18 extending parallel to the rotation axis of the drum 11, on which is mounted a movable carriage 20. The carriage 20 is driven along the shaft 18 via a moving screw 21, which is rotated by a constant torque motor 22, which is controlled by a regulating amplifier 24.

The wire deposition apparatus 26 is mounted on the carriage 20. The wire deposition apparatus comprises a heated crimping tool in the form of a wire supply reel 27 mounted on a corresponding support, an electrically heated pressure roller 28, which embeds the wire coming from the supply reel 27 in the film, as well as appropriate guide means (not shown) for the wire between the supply reel 27 and the pressure roller 28. A more detailed description of a wire deposition apparatus for depositing a straight wire can be gathered from EP 553 025 A1, to which reference should be made in this connection.

The wire deposition apparatus 26 is mounted on a vertical shaft 29 which is rotatably installed on the carriage 20. The angular position of the shaft 29, and so of the wire deposition apparatus 26, is controlled by a constant torque motor 31, via a pair of bevel gears 30. The constant torque motor 31 is controlled by a regulating amplifier 32.

An essential component of the apparatus is the controller 35 for the program control of the apparatus. This processor 35 may be, but is not limited to, a conventional general purpose programmable computer having an appropriate data memory into which are introduced the data for the time-travel program on the basis of which the wire 8 is to be deposited on the films 1, 2 and on the cylindrical drum surface between the two films 1, 2.

The processor 35 controls, in accordance with the program stored therein, the regulating amplifier 16 for the rotation of the drum 11 via the control line 36, the regulating amplifier 24 for the rotation of the moving screw 21 via the control line 37, and the regulating amplifier 32 for the angular adjustment of the wire deposition apparatus 26 via the control line 38. As a result, a two dimensional wire laying pattern can be applied to the films on the drum 11 by the appropriate combination of movements of the drum, the wire deposition apparatus 26 and the carriage 20. In particular, the pattern can be an arc conforming to the curve of the edge 5, or any other desired pattern.

Several carriages 20, each provided with a wire deposition apparatus, can be located on the guide 18, so that, assuming an adequate length of the drum 11 viewed in the axial direction of the drum 11, several films can be mounted to the drum 11 and simultaneously provided with a wire.

When the wire 8 has been applied in the described manner to the films 1, 2, in the desired surface area, the processor 35 stops the rotary drive of the drum 1. Copper foil strips 40 are fixed beforehand to the films at their lateral edges and are surface-tinned on the side provided with the wire 8. After application of the wires 8, second copper foil strips having a tinned surface are applied to the existing copper foil strips 40, with the wires 8 held therebetween. The copper foil strips applied to one another are then brazed together, including the wire 8, e.g., with a soldering iron. The wires are then cut outside the films 1, 2 and near the copper foil strips which serve as power supply conductors. The films 1, 2 are then removed from the drum 11 after eliminating the vacuum prevailing in the drum 11 and are further processed with a view to their incorporation in the laminated glazings.

Obviously, numerous modifications and variations of the present invention are possible in light of the above teachings. It is therefore to be understood that the invention may be practiced otherwise than as specifically described herein.

What is claimed as new and desired to be secured by Letters Patent of the United States is:

1. Method for the application of a thin metal wire onto the surface of a thermoplastic film of a laminated glazing, comprising the steps of:

maintaining the thermoplastic film on the surface of a rotary drum;

rotating the drum;

continuously depositing a metal wire on the film using a wire deposition apparatus which is movable in two directions extending parallel to the axis of the drum; and using a controller to control movement of the wire deposition apparatus according to a time-travel program set in the controller in accordance with a desired shape of the wires so as to move the wire deposition apparatus in the two directions while depositing the metal wire.

2. Method of claim 1 including the step of using the controller to simultaneously control rotation of the drum and movement of the wire deposition apparatus according to the time-travel program.

3. Method according to claim 2 wherein an angular position of the wire deposition apparatus is adjustable, including the step of using the controller to control an angular position of the wire deposition apparatus simultaneously with the control of movement of the wire deposition apparatus along the guide.

4. Method according to claim 1 wherein said step of using the controller to control movement of the wire deposition apparatus includes the desired shape of the wires which is arcuate.

5. Method according to claim 2 wherein said maintaining step comprises applying a vacuum through a surface of the drum having the thermoplastic film thereon.

6. Method according to claim 2 including maintaining two of said thermoplastic films on said drum, and performing said depositing step such that the metal wire has an undulating shape on the drum surface.

7. Method according to claim 2 including the steps of connecting the deposited metal wires to power supply conductors and cutting the metal wires.

8. Apparatus for the application of a thin metal wire onto the surface of a thermoplastic film of a laminated glazing, comprising:

a hollow cylindrical drum having a perforate cylindrical surface;

a drive motor for rotating the drum;

means for applying a vacuum through the perforate surface such that a film on the perforate surface may be fixed thereto by suction;

a wire deposition apparatus positioned for embedding a metal wire in a film fixed to the perforate surface of the drum and mounted to be movable in a direction parallel to the axis of the drum; and a controller having a time-travel program set therein for simultaneously controlling rotation of the drum and movement of the wire deposition apparatus according to a desired shape of the wires in accordance with the time-travel program.

9. Apparatus according to claim 8 wherein the wire deposition apparatus is mounted on a carriage movable along the direction parallel to the axis of the drum via a shaft which is rotatable perpendicularly to the axis of the drum.

10. Apparatus according to claim 9 wherein an angular position of the shaft of the wire deposition apparatus is controlled by a constant torque motor, wherein said controller also controls said constant torque motor in accordance with the time-travel program.

* * * * *